J. H. DAVIS & J. W. MORGAN.
DRAFT CONNECTION CONTROL FOR GANG DISK PLOWS.
APPLICATION FILED MAY 12, 1913.

1,257,282.

Patented Feb. 19, 1918.
2 SHEETS—SHEET 1.

WITNESSES:
Charles Pickles
R. L. Burry

INVENTOR
John H. Davis,
John W. Morgan
BY G. H. Strong.
ATTORNEY

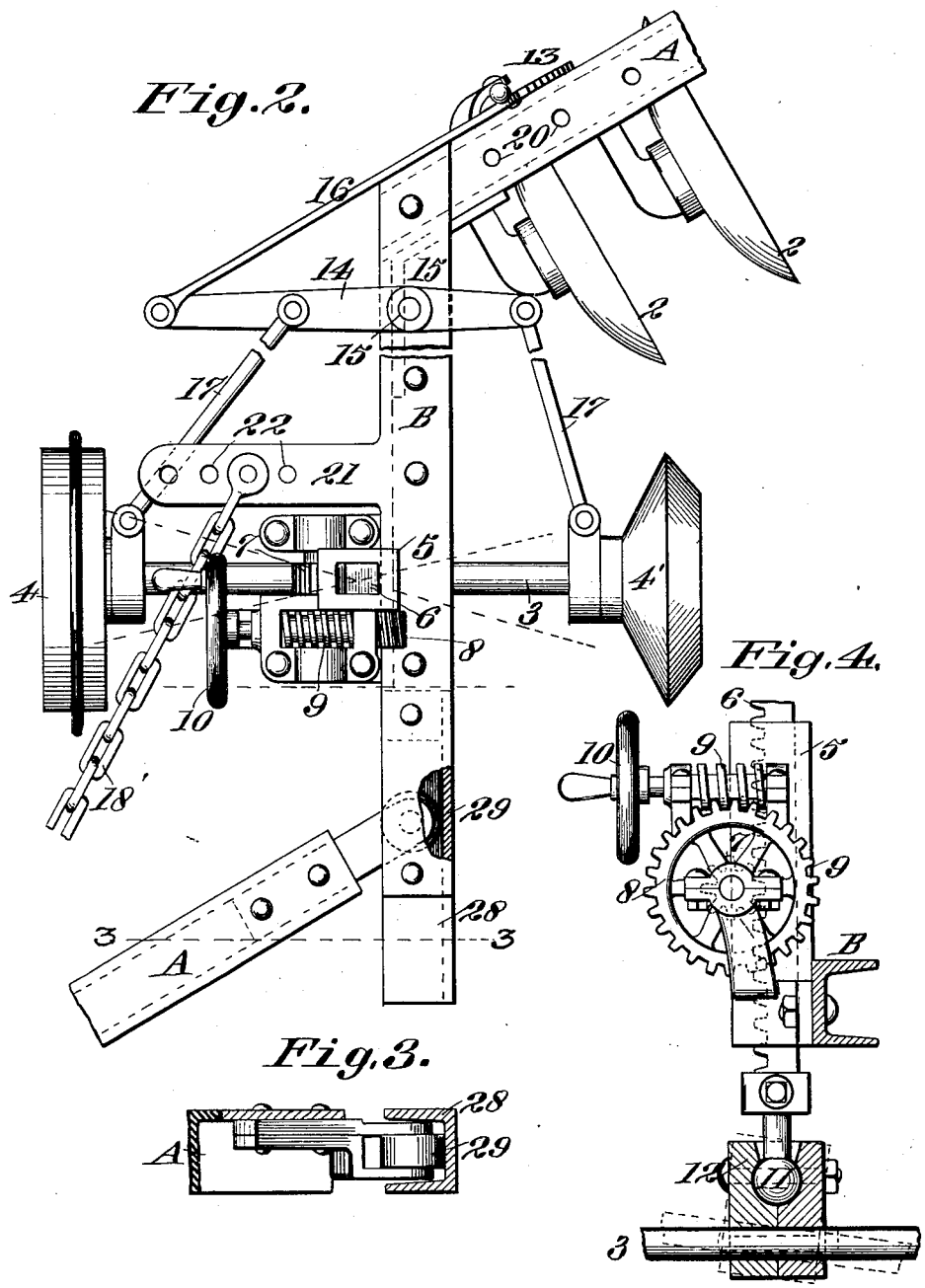

UNITED STATES PATENT OFFICE.

JOHN H. DAVIS AND JOHN W. MORGAN, OF STOCKTON, CALIFORNIA; SAID MORGAN ASSIGNOR TO SAID DAVIS.

DRAFT-CONNECTION CONTROL FOR GANG DISK PLOWS.

1,257,282. Specification of Letters Patent. Patented Feb. 19, 1918.

Original application filed October 12, 1912, Serial No. 725,540. Divided and this application filed May 12, 1913. Serial No. 766,990.

*To all whom it may concern:*

Be it known that we, JOHN H. DAVIS and JOHN W. MORGAN, both citizens of United States, residing at Stockton, in the county of San Joaquin and State of California, have invented new and useful Improvements in Draft-Connection Controls for Gang Disk Plows, of which the following is a specification.

This invention relates to disk plows and particularly pertains to a draft connection and control for gang disk plows; this application being in part for divisional subject-matter of our original application Serial Number 725,540, filed October 12, 1912.

It is the object of this invention to provide a disk plow which is especially adapted to be employed in gangs of two or more plows and to provide a draft and steering-gear therefor by means of which any suitable number of plows can be hauled by a single draft connection, with the traction means and the gangs controlled from the rearmost plow. Another object is to provide a draft-gear for a succession of gangs, and which is so arranged that each succeeding gang will be drawn by a single draft connection or chain from the gang immediately in advance thereof, as distinguished from the usual method of connecting the several gangs independently to a long draft bar. Another object is to so construct the plow frames for each gang that a number of gangs can be quickly connected together, which gangs are designed to be arranged in such relation to one another that the haul upon one gang will tend to crowd the gang in advance thereof toward the plowed ground in opposition to the tendency of the plows to run to land or toward the unplowed ground. A further object is to provide a novel means for connecting each succeeding gang plow to the gang forward thereof, which will permit of a change in the angular position and allow a limited advanced or retracted movement of one gang plow in relation to the other without altering the effectiveness of the draft and which is such as to permit the forward gangs to be steered and controlled from the rearmost gang thereby rendering the employment of an operator for each gang unnecessary.

The invention resides primarily in an angular plow-frame, the forward portion of which carries the plow-disks and the rearward portion of which is supported on a steering truck, means for steering the truck, means for raising and lowering the plow-frame in relation to the steering truck, means for connecting the forward end of one frame to the rearward end of another, which will allow of a combined swinging and advancing and retracting movement of one frame in relation to the other, and an adjustable draft connection between adjacent plow-frames so arranged that when a pull is exerted thereon and communicated to the plow-frame, the latter will bear against the plow-frame in front thereof and crowd it toward the plowed ground and prevent the plows from running too much to land.

The invention further consists of the parts and the construction and combination of parts as hereinafter more fully described and claimed, having reference to the accompanying drawings, in which—

Fig. 2 is an enlarged detail plan view with parts broken away, illustrating the connections between adjacent gangs.

Fig. 3 is a detail section and elevation on the line 3—3 of Fig. 2.

Fig. 4 is a detail elevation, partly in section, of the mechanism for raising and lowering the plow frame in relation to the steering truck, showing the universal joint connection between the plow frame and axle.

Figure 1:
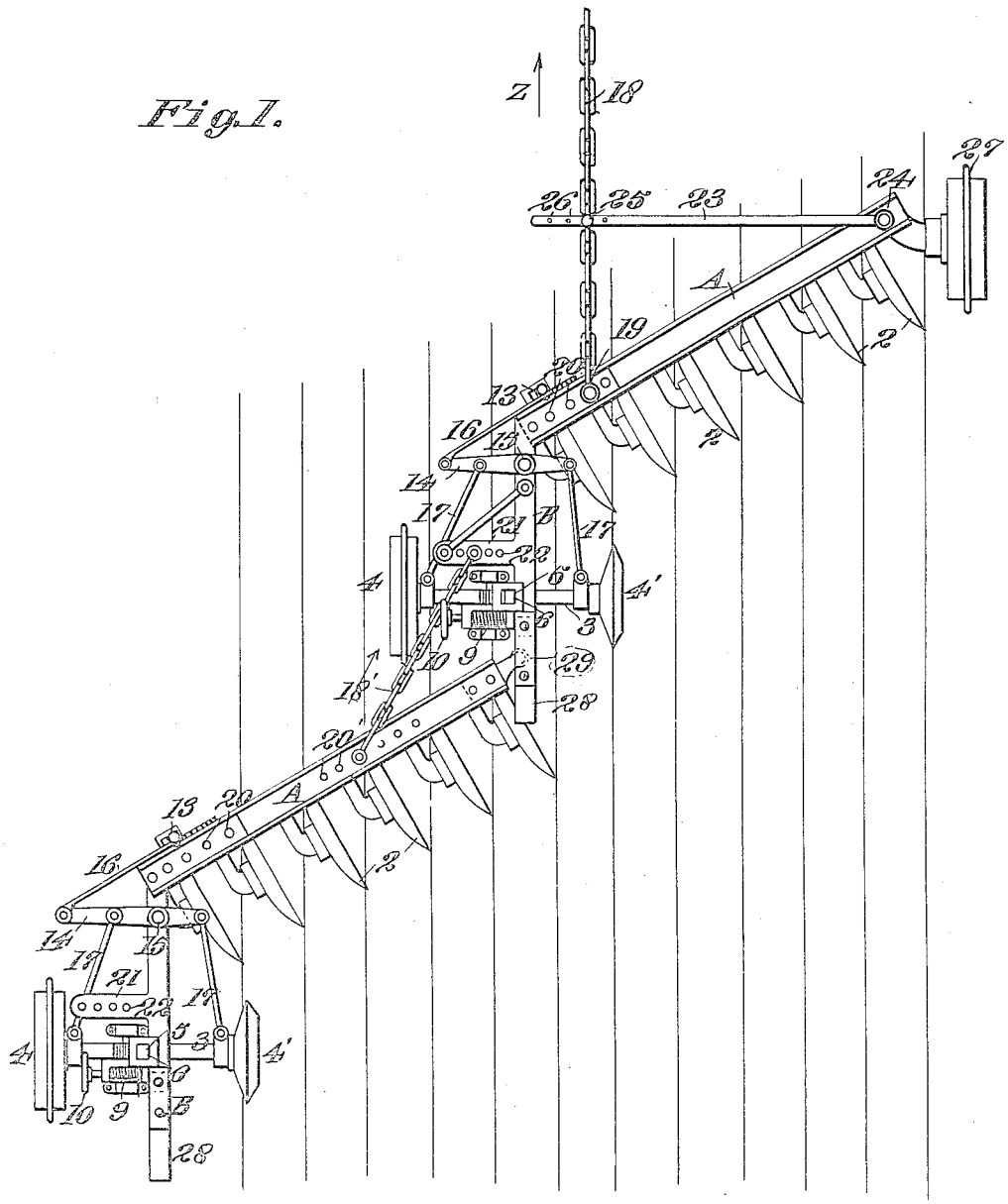
Figure 1 is a plan view of a gang plow constructed in accordance with this invention.

In the drawings the plow-frame is shown as formed of two horizontal members A and B, disposed at an angle of approximately 120° in relation to each other, which members may be constructed in one piece or of separate pieces, rigidly bolted together.

The forward member A carries a series of disk-plows 2, of any suitable description, on its underside, in the manner common in disk-plows; the disks 2 being disposed at right angles to the frame member A, and at an angle to the path of travel of the plow frame. The plow-frame with its set of plows constitutes a gang or what is termed a disk gang plow.

The member B extends in the direction of travel of the plow-frame and is supported at its outer end on an axle 3 and wheels 4—4' thereon, in the following manner:

Mounted on the member B is a vertically extending guide post 5, in which a bar 6 is reciprocably mounted, and which bar is formed with rack teeth on one of its vertical edges. A pinion 7 on a shaft carrying a gear 8, meshes with the rack teeth on the bar 6, and a worm-gear 9 on a shaft carrying a crank-wheel 10, meshes with the gear 8, in such manner that when the crank-wheel 10 is rotated the bar 6 will be caused to move up or down in the guide post 5. Formed on the lower end of the bar 6 is a ball 11 which is inclosed in a socket 12 carried on the axle 3; the ball 11 and socket 12 forming a universal joint between the axle 3 and the frame B, which joint will admit of the axle 3 rocking in vertical direction, as indicated in dotted lines in Fig. 4, and in a horizontal direction as indicated in dotted lines in Fig. 2. The vertical oscillating movement of the axle 3, permitted by the ball and socket joint, admits of the truck assuming various angles, due to unevenness of the ground, particularly when the wheel 4' is traveling in the furrow cut by the rearmost disk 2.

The part B, axle 3 and wheels 4—4' constitute what we term a truck to support the rear end of the gang frame or plow-frame A.

Horizontal movement of the axle 3 takes place in steering or directing the plow, and is accomplished by means of a hand lever 13 connected to a bar 14 pivotally mounted at 15 on the member B of the plow-frame, by means of a connecting rod 16. Attached to the bar 14 on the opposite side of the pivotal joint 15 thereof, are connecting rods 17 which are attached to the outer ends of the axle 3 in such manner that when the rod 14 is rocked by means of the lever 13, the axle 3 will be caused to move in a horizontal direction.

An important feature of this invention resides in the draft-gear through which the plow is hauled. This draft-gear is here shown as consisting of a chain 18 which is connected to the portion A of the plow-frame by means of a clevis 19 at a point adjacent the junction of the members A and B; a series of perforations 20 being formed in the member A to receive the clevis pin and permit of the draft-chain 18 being attached to the plow-frame A at various points.

Where the plows are to be employed in a series of gangs, the draft-chain 18 on the forward gang connects with the traction engine, or other hauling power, while the draft-chain 18' on each succeeding gang is connected at its outer end to an arm or lateral projection 21 formed on the preceding plow frame adjacent to or rearward of the juncture of the members A and B, and extending outwardly at right angles to the latter. In the present case we have shown two gangs connected together; the front gang being designed to be connected to the traction engine by the chain 18; as many more gangs may be attached in this manner as may be desired.

The arm 21 is formed with a series of perforations 22 to receive the pin of a clevis attached to the outer end of the chain 18'; the series of perforations being provided so that the draft may be adjusted at this point.

The foremost plow-frame is provided with a distance bar for regulating the draft of the forward plow. This distance bar is indicated at 23 and is shown as pivotally connected at 24 to the forward end of the member A, and is connected to the draft chain 18 by means of a pin 25, inserted through one of a series of perforations 26 formed in the distance bar 23, adjacent its outer end. The draft of the forward plow-frame may be adjusted by connecting the distance bar to the chain 18 at different points. The forward end of the foremost plow-frame is supported upon a furrow wheel 27, of any suitable description, while the forward ends of the succeeding plow-frames are supported by the rear end of the plow-frame, truck 3—4—B, immediately in advance thereof.

The connection between the foremost plow and the one immediately therebehind consists of a horizontal channel 28 formed on the outer end of the portion B on the forward plow frame, and a horizontally disposed roller 29 carried on the outer end of the portion A of the rearward plow-frame; the roller 29 bearing against the vertical wall of the channel 28 and forming a slidable and a pivotal connection between the adjacent plow frames at this point. The forward end of the rearward plow will thus be supported upon and carried by the trucks of the plow-frame in advance thereof through the frame of the forward plow. It is manifest that any suitable coupling may be employed between the adjacent plows that will admit of a combined slidable and pivotal movement of one frame in relation to the other.

The draft of the foremost gang is regulated by means of the adjustable distance bar 23, while the draft on the rearward gangs is adjusted by connecting the chain 18' to different points on the member A or the arm 21 of the gang frame immediately in front.

When a pull is exerted upon the chain 18' connecting the forward gang and the one immediately therebehind, the direction of the pull upon the plow-frame through the chain 18' will be such as to cause the forward end of the rearward plow-frame A to crowd against the rear end of the plow-frame B on the forward plow-frame, in such manner as to tend to maintain the several gangs in proper alinement. The connection between the plow-frames is designed to be such that there will be no pull upon the rear gang through the plow-frames other than that exerted through the draft-chain 18'.

In steering the plows, the operator employs the lever 13 on the rearmost gang. By directing the rearmost gang, the direction of the push of the forward end of this gang upon the gang immediately in advance thereof, will be varied, tending to crowd the forward gangs toward the plowed ground when necessary; the plows naturally moving toward the land when the rear trucks are turned in that direction by reason of the tendency of the disk plows 2 to climb.

Normally, this tendency may be overcome by adjusting the draft chains 18'; these chains being taken up or let out as occasion may require, at the point of connection between the ends of the chain 18' and the frame portion A on the rear plow frame, and the portion B on the forward plow-frame, by means of the perforations 22 in the arm 21 and perforations 20' in the frame portion A of the rear plow.

It will be observed by reference to Fig. 1, in which the direction of forces are indicated by arrows, that the pull upon the forward hauling chain 18 is in the direction of the path of travel of the plow, which path of travel is denoted by the arrow Z. Now if a single gang was used, the tendency of the plows of that gang to travel toward the land would have to be overcome by setting the steering wheels 4—4' at an angle toward the plowed ground, but where two or more gangs are employed and are connected together by means of the chains 18', this setting of the steering wheels at an angle to the path of travel is unnecessary. This is occasioned by reason of the pull on the rearward plows being exerted in a direction at an angle to the path of travel thereof and in opposition to the tendency of the plows to move inland. By connecting the adjacent plow-frames together, as before described, each gang will crowd against the plow-frame immediately in advance thereof, and thereby overcome the inland movement of the plows; the resistance offered by the preceding gangs limiting the crowding action of the gang therebehind, thereby retaining the several gangs in proper alinement. The loose connection between the forward end of one plow and the rear end of the one in advance thereof, formed by the channel 28 and roller 29, will allow a slidable and a pivotal movement of the rear frame in relation to the forward frame; the rear frame swinging on its connection with the chain 18'. The roller 29 acts to reduce the friction at the point of contact between the adjacent frames.

Having thus described our invention what we claim and desire to secure by Letters Patent is:

1. In a gang plow, the combination of a plurality of connected gangs, each gang having a plow-frame carrying a series of plow disks, a truck supporting the rear end of each succeeding plow-frame, steering means in connection with each truck, thrust imparting means between the adjacent ends of adjacent plow-frames, and a draft connection between the successive plow-frames whereby each succeeding plow-frame is attached to and pulled from the rear end of the plow-frame in front so that a side thrust of a rear gang is exerted directly against the rear end of the preceding gang.

2. In a gang plow, the combination of a plurality of connected gangs, each gang having a plow-frame carrying a series of plow-disks with the rear end of the frame supported on a truck, thrust imparting means between the adjacent ends of adjacent plow-frames, and a draft connection arranged between adjacent plow-frames to exert a pull on the rear frame at an angle to the path of travel of the machine to cause the forward end of the rear gang to crowd against the rear end of the preceding gang, and means to control the path of travel of the machine from the rear frame.

3. In a gang plow, the combination of a plurality of connected gangs, each gang having a plow-frame carrying a series of plow disks, thrust imparting means between the adjacent ends of adjacent plow-frames, and a draft connection between the successive plow-frames whereby each succeeding plow-frame is attached to and pulled from the rear end of the plow-frame in front so that a side thrust of a rear gang is exerted directly against the rear end of the preceding gang.

4. In a gang plow, the combination of a series of connected gangs, each comprising a plow-frame carrying a series of angularly disposed plow disks, a truck supporting the rear end of each plow-frame, each plow-frame, except the foremost, being pivotally supported on the truck immediately in front, a diagonal draft chain from the truck in front to the frame immediately in the rear, and means independent of the traction means for controlling both gangs from one truck.

5. In a disk plow, an angular frame, a series of plow-disks carried by the forward angular portion of the frame, a truck on which the rear angular portion of the frame is carried, and means on the end of the rear angular portion adapted to slidably receive the forward end of a corresponding plow-frame immediately therebehind to form a support for the latter.

6. In a disk plow, an angular frame, a series of plow-disks carried by the forward angular portion of the frame, a truck on which the rear angular portion of the frame is carried, means on the end of the rear angular portion adapted to slidably receive the forward end of a corresponding plow-frame immediately therebehind to form a support for the latter, a perforated lateral projection on the rear angular portion of the frame, and a draft chain attached thereto and connecting with the succeeding plow frame to pull the latter and crowd its front end against the rear end of the forward frame.

7. In a gang plow, the combination of a plurality of angular frames, a lateral projection on said frames adjacent the juncture of the angles thereof, a draft chain connecting the projection on one frame to the forward angular portion of the frame immediately therebehind, and a slidable pivotal connection between the rear end of one frame and the forward end of the frame therebehind forming a support for the latter.

8. In a gang plow, the combination of a plurality of angular frames, a lateral projection on said frames adjacent the juncture of the angles thereof, a draft chain connecting the projection on one frame to the forward angular portion of the frame immediately therebehind, and a horizontal roller on the forward end of one frame adapted to travel in a channel on the rear end of the frame immediately in front thereof.

9. In a gang plow, the combination of a plurality of succeeding angular frames, a draft chain connecting one frame at a point adjacent its angle to the frame therebehind forward of its angle, and a pivotal connection between the rear end of one angular frame and the forward end of the frame rearward thereof, said connection forming a support for the front end of the rearward frame and an end thrust bearing for the latter to permit the forward movement of the rear frame to crowd the front frame sidewise.

10. In a gang plow, the combination of a plurality of succeeding angular frames, a draft chain connecting one frame at a point adjacent its angle to the frame therebehind forward of its angle, and a pivotal connection between the rear end of one angular frame and the forward end of the frame rearward thereof, said connection comprising a channel on the rear end of one frame and a horizontal roller on the forward end of the frame therebehind, said roller extending into said channel.

11. In a gang plow, a series of gangs arranged one in front of the other, each gang including a plow frame carrying a series of plow disks, the front ends of the rear frames of the gangs having noses which bear against and are adapted to move bodily with relation to and while in engagement with the rear end of the adjacent front frame, and means to connect a rear frame to an adjacent front frame whereby the draft upon the rear frame causes the nose thereof to exert a lateral thrust against the adjacent front frame.

12. In a gang plow, a series of gangs arranged one in front of the other, each gang including a plow frame carrying a series of plow disks, the front ends of the rear frames of the gangs having noses which movably bear against the rear end of the adjacent front frame and are capable of oscillating about the points of contact of the noses with the adjacent frames, and adjustable connections between a rear and the adjacent front frame whereby the draft upon the rear frame causes the nose to adjustably exert a lateral thrust against the adjacent front frame.

13. In a gang plow, a series of gangs arranged one in front of the other, each gang including a plow frame carrying a series of plow disks, a rearwardly extending abutment on each of the frames extending parallel to the path of travel of the plow, the front ends of the rear frames of the gangs having noses which movably bear against the abutment of the adjacent front frame, and adjustable connections between a rear and the adjacent front frame whereby the angular relationship between a front and the adjacent rear frame may be controlled.

14. In a gang plow, a series of gangs arranged one in front of the other, each gang including a plow-frame carrying a series of plow disks, means between the front end of a rear frame and the rear end of the adjacent front frame and bodily shiftable with respect to said rear frame, whereby the draft of the rear frame will cause a lateral thrust to be exerted upon the rear end of the said adjacent front frame, and means to connect the rear frames to the rear ends of the succeeding front frames to effect the latteral thrust.

15. In a disk plow, a plurality of stepped gang sections each including a frame and a series of one-way disks, a primary draft connection for the front gang, and a pivotal connection between adjacent gang sections having an axis free to shift relative to the frame 16. In a disk plow, a plurality of stepped gang sections, arranged obliquely to the line of draft and each including a series of one-way disks and a draft connection between the rear end of each gang and the succeeding gang, said connection forming the sole draft means for the succeeding sections.

In testimony whereof we have hereunto set our hands in the presence of two subscribing witnesses.

JOHN H. DAVIS.
JOHN W. MORGAN.

Witnesses as to John H. Davis:
W. W. HEALEY,
J. H. HERRING.

Witnesses:
W. W. DOOLITTLE.
MYRA SHADE.